United States Patent [19]
Mieda

[11] Patent Number: 5,918,497
[45] Date of Patent: Jul. 6, 1999

[54] METALWORKING METHOD WHEREIN FORMED CONFIGURATION LOCATES BLANK

[75] Inventor: Kenji Mieda, NEYAGAWA, Japan

[73] Assignee: EXEDY Corporation, Neyagawa, Japan

[21] Appl. No.: 08/990,786

[22] Filed: Dec. 15, 1997

[30] Foreign Application Priority Data

Dec. 13, 1996 [JP] Japan .................................. 8-334143

[51] Int. Cl.$^6$ ........................... B21D 13/02; B21D 13/08
[52] U.S. Cl. ................................ 72/177; 72/180; 72/187; 72/198; 72/379.6; 72/414
[58] Field of Search .................... 72/404, 385, 379.6, 72/414, 177, 180, 187, 197, 198

[56] References Cited

U.S. PATENT DOCUMENTS

| | | | |
|---|---|---|---|
| 1,018,399 | 2/1912 | Livingston | 72/187 |
| 1,741,905 | 12/1929 | Beck | 72/187 |
| 3,474,513 | 10/1969 | Allingham | 72/379.6 |
| 4,041,749 | 8/1977 | Veitl | 72/198 |
| 4,434,643 | 3/1984 | Almqvist | 72/385 |
| 4,450,706 | 5/1984 | Engelmohr | 72/385 |
| 4,840,054 | 6/1989 | Sjogren | 72/385 |
| 4,989,440 | 2/1991 | Sjogren | 72/385 |

FOREIGN PATENT DOCUMENTS

| | | | |
|---|---|---|---|
| 155488 | 6/1982 | Germany | 72/385 |
| 54218 | 4/1980 | Japan | 72/385 |
| 617116 | 7/1978 | Russian Federation | 72/385 |

*Primary Examiner*—Daniel C. Crane
*Attorney, Agent, or Firm*—Shinjyu An Intellectual Property Firm

[57] ABSTRACT

A metalworking iterative method of cold-working blanks into configurations having contiguously repeated predetermined forms wherein an advance-worked form functions to locate a succeeding form. A first portion of a blank is squeezed into a predetermined form in a forming position of a press. The predetermined form corresponds to one cycle of the reciprocal undulations of an undulated plate spring. The blank is then shifted in the feed direction of the press by a feed pitch corresponding to one undulation, thereby locating the worked first portion of the blank into a locating position of the press, meanwhile a pitch-length second portion is in the forming position. Accordingly, the accuracy of the succeeding press operation on the second portion in terms of its contiguous position relative to the worked first portion is secured. Moreover, press dies which conform to the predetermined form are sufficient to cold-work the blanks, and can be smaller than dies corresponding to the entire finished configuration working press space requirements are reduced, curtailing costs accordingly.

26 Claims, 7 Drawing Sheets

METALWORKING METHOD WHEREIN FORMED CONFIGURATION LOCATES BLANK

BACKGROUND OF THE INVENTION

The present invention relates to a method of cold-working metal blanks and in particular it relates to a method of shaping blanks into a configuration having predetermined forms repeated contiguously

DESCRIPTION OF RELATED ART

In conventional processes for shaping metal blanks into irregular sectional shapes, blanks of small size or length can be worked in a press, but blanks of relatively large size or length must be worked with rolls.

Figure 8:
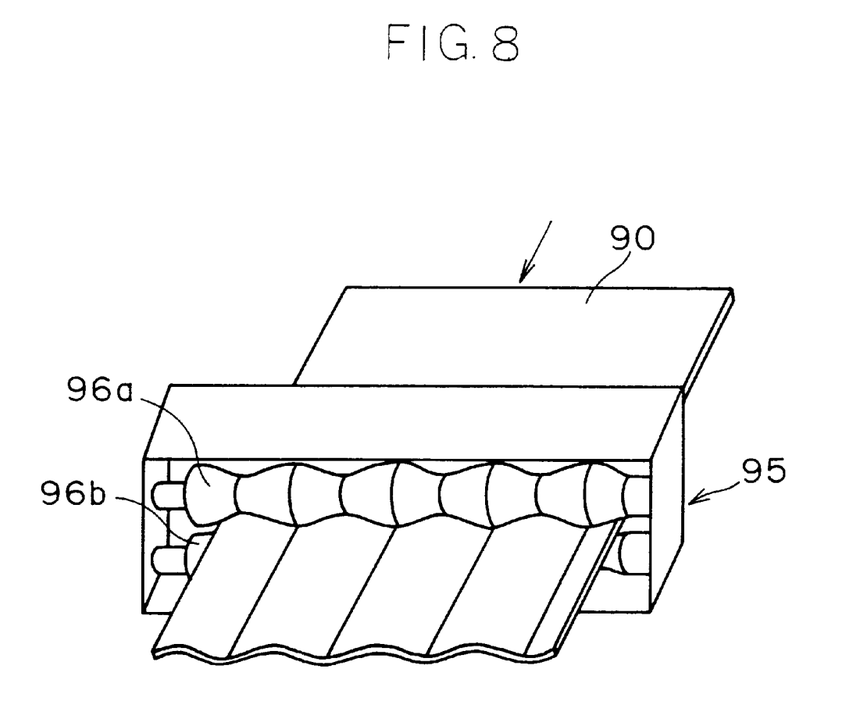
FIG. 8 is an orthographic view illustrating roll configuration in a conventional rolling mill.
Figure 9:
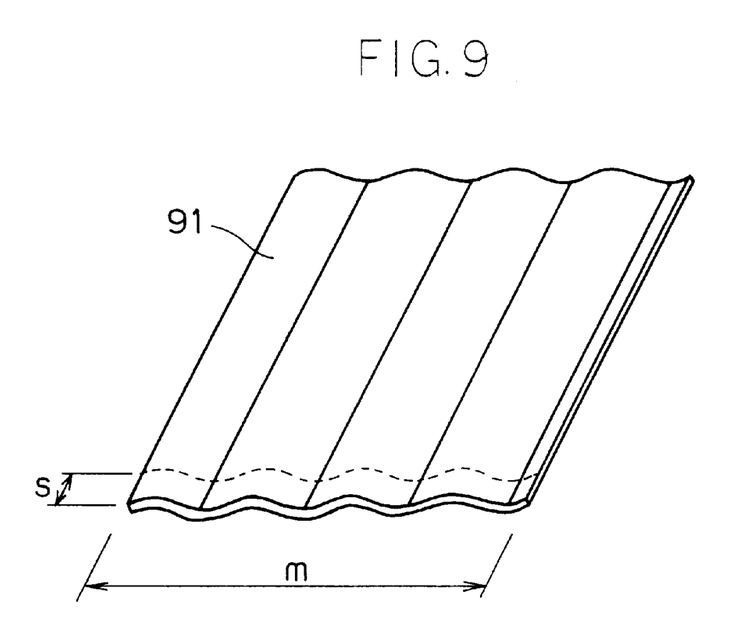
FIG. 9 is an orthographic view of a formed article produced by a conventional rolling mill as shown in FIG. 8.

An example of forming a metal blank 90 in a rolling mill will be described below with reference to FIG. 8. The diameter of upper roll 96a and of lower roll 96b in mill 95 varies longitudinally in each corresponding to the cross-sectional shape of a precursor 91 that is to be formed from a metal blank. The precursor 91 is formed by rolling, and is cut into the required width s in a succeeding step, as shown in FIG. 9.

The foregoing rolling process thus requires that rolls 96a and 96b be of length corresponding to dimension m of the precursor 92. In order to work blanks of longer dimension m, the rolling machine 95 must be of accordingly larger size, leading to cost and space problems. This is likewise the case even wherein the predetermined shapes of the formed configuration are repeated. Such problems also arise wherein the blanks are worked in a press, in which case the press dies and therefore the press itself must accordingly be enlarged.

Further, during trial stages in the manufacture of formed metalworking articles, products of varying cross-section have to be formed in order to seek out the most suitable shape to meet the requirements of a particular application. Therefore, each time the formed configuration is to be changed, long rolls and large die presses are prepared to correspond in contour to the shape sought, and this frequently takes away from commercial profits.

SUMMARY OF THE INVENTION

An object of the invention is to reduce the required size of metal cold-working apparatus thereby controlling manufacturing cost and space requirements, by a method of shaping blanks that are to be worked into configurations having contiguously repeated predetermined forms, wherein an advance-worked form functions in location to maintain the positioning accuracy of a succeeding form.

According to one aspect of the inventive method, a first portion of a blank is worked in a first step into a predetermined form in a forming position of a press. In a second step, the blank is then shifted along the feed direction relative to the press by a distance corresponding to the feed-direction dimension of the predetermined form This operation locates the first portion of the blank into a locating position of the press ahead in the feed direction to the forming position of the press wherein a second, succeeding portion of the blank is subsequently worked. In a third step, the first and second steps are repeated a predetermined number of times to yield a cold-worked product having a desired configuration.

In another aspect of the invention, the forming position of the press is defined by opposing die surfaces complementary to the predetermined form, and one of the opposing surfaces is repeated at least partially in the feed direction of the blank to define the locating position. Accordingly, in the second step at least a rear part of the advance-formed portion of the blank is captured into the locating position of the press when the contiguous portion of the blank to be formed next is shifted into the forming position.

Ordinarily, the above-described operations of the inventive method are executed along the longitudinally major dimension of a blank, such that it is finished with the predetermined form repeated at least twice contiguously in the longitudinal direction.

In a further aspect, the inventive method is employed to form an undulated spring. In a preparatory step, a strip blank is shaped so as to impart varying thickness to the blank. The blank is then worked as above-described to form it into a predetermined preliminary configuration including repeated preliminary curvatures greater than corresponding finished curvatures defining the undulated spring. In a finishing step, the strip is finish-bent along the preliminary curvatures into a configuration of reciprocal repeating undulations.

In an additional aspect, the foregoing preparatory step of shaping the strip blank so as to impart to it varying thickness is executed simultaneously with the previously described steps of cold-working the blank to yield the desired configuration. Accordingly, the number of steps can be reduced by one.

In yet a further aspect wherein the inventive method is employed to form an undulated spring, the strip blank is worked to have varying width in addition to varying thickness, in a width-dimensioning process carried out before the above-described third step, in which the foregoing first and second steps of forming and shifting the blank are repeated, is carried out. The finished undulated spring can accordingly be of varying width in addition to varying thickness.

In a still further aspect of the inventive method, the above-mentioned first, second and third steps are carried out by a roll mill instead of by a press.

In yet another aspect wherein the inventive method is employed to form an undulated spring, the preparatory step of imparting varying thickness to the blank is carried out by a roll mill having irregular rolls instead of by the press.

Accordingly, cold-working can be carried out with a rolling mill having rolls separated by a gap which may be operationally varied, or irregular rolls, to achieve substantially the same operation and effect as the press employed in the inventive method in its foregoing aspects. The inventive method in this aspect, therefore, can achieve the substantially same the effects.

Conventionally, press dies or rolls having sizes corresponding to the entire intended configuration of a finished article must be used for shaping the blank. Moreover, even wherein the blank is to be shaped into a configuration of contiguous repeated forms, the dies or rolls must be size equal to or longer than the overall size or length of the finished article, increasing the bulk of the metalworking apparatus.

In the present inventive method, the repeated forms of the configuration into which the blank is worked are formed in succession. Accordingly, press dies which conform to one or more predetermined forms are sufficient to cold-work the blanks, and can thus be smaller than dies corresponding to the overall configuration This reduces the required size of the working apparatus and thus the space it occupies, and curtails costs accordingly.

Further, coil stock and rod blanks cannot be cold-worked conventionally in a rolling mill, wherein they are to be formed into a longitudinally repeated configuration The coil stock or rod blank has to be formed and cut into a plate before it can be worked in the rolls. This makes it difficult to produce formed articles from only that amount of material necessary, which often results in reduction in yield.

By the present inventive method, coil stock or rod blanks, i.e., stock of longitudinally major dimension may be employed, since it is worked into a desired configuration of repeated forms in correspondingly iterative operations. By thus enabling the cold-working of coil stock or rod blanks directly increases in yield can be expected.

As described above, the blank is shifted relative to the press to form iterativley the formed portions of the desired configuration, or to form the predetermined shapes in succession one by one. For this movement, great care should be taken to maintain the accuracy of the overall configuration of the product and in particular the accuracy of the direction of relative movement.

Accordingly, to ensure accuracy in the shifting operation of the present inventive method, a pilot hole or recess may be formed in advance in the blank, as is conventionally done for positioning. However, products having pilot holes or recesses may not be acceptable as finished articles.

According to the inventive method in the foregoing aspect, nevertheless, at least one of the die surfaces defines the locating portion, wherein the advance-formed portion of the metal blank can serve to maintain the positioning accuracy of the succeedingly formed portion. Thereby, it is possible to maintain predetermined accuracy in size in the case of the present inventive method, according to which a unit forming process is repeated in order to produce from a blank the overall configuration desired.

The preliminary configuration of an undulated plate spring to be formed is a strip in plan view, and viewed from the side is of varying thickness and is configured to have contiguous forms each including predetermined curvatures. Conventionally, press-working is impracticable due to costs because lengthy press dies are required. Also, roll working cannot be employed without difficulty due to costs and because the preliminarily shaped product enters a succeeding bending station with its material fibers oriented in a direction which tends to reduce its strength. Particularly in such trial manufacturing wherein trial pieces having various curvature radii and thicknesses are produced in order to test the performance of undulated plate springs, new long rolls or press dies must be prepared every time a new configuration is to be tested. This increases costs and consequently is unprofitable in many cases.

Since the blank is shaped into the preliminary configuration in the inventive method of forming an undulated spring, the finish bending step can be performed easily, and intended accuracy can be readily maintained. Particularly, if a portion of a blank of small thickness were bent into a final configuration without performing the preliminary bending, in some cases elastic properties would not be gained in view of the material strength of the blank. Therefore, the step of forming the preliminary configuration is essential. In other words, employing this step increases the range of manufacturable configurations of the undulated plate spring, and further can improve its properties.

The foregoing and other objects, features, aspects and advantages of the present invention will become more apparent from the following detailed description, when taken in conjunction with the accompanying drawings.

BRIEF DESCRIPTION OF THE DRAWINGS

FIG. 3b is a fragmentary orthographic view of reciprocal undulations of the undulated plate spring of FIG. 3a;

DETAILED DESCRIPTION OF THE PREFERRED EMBODIMENTS

Figure 1:
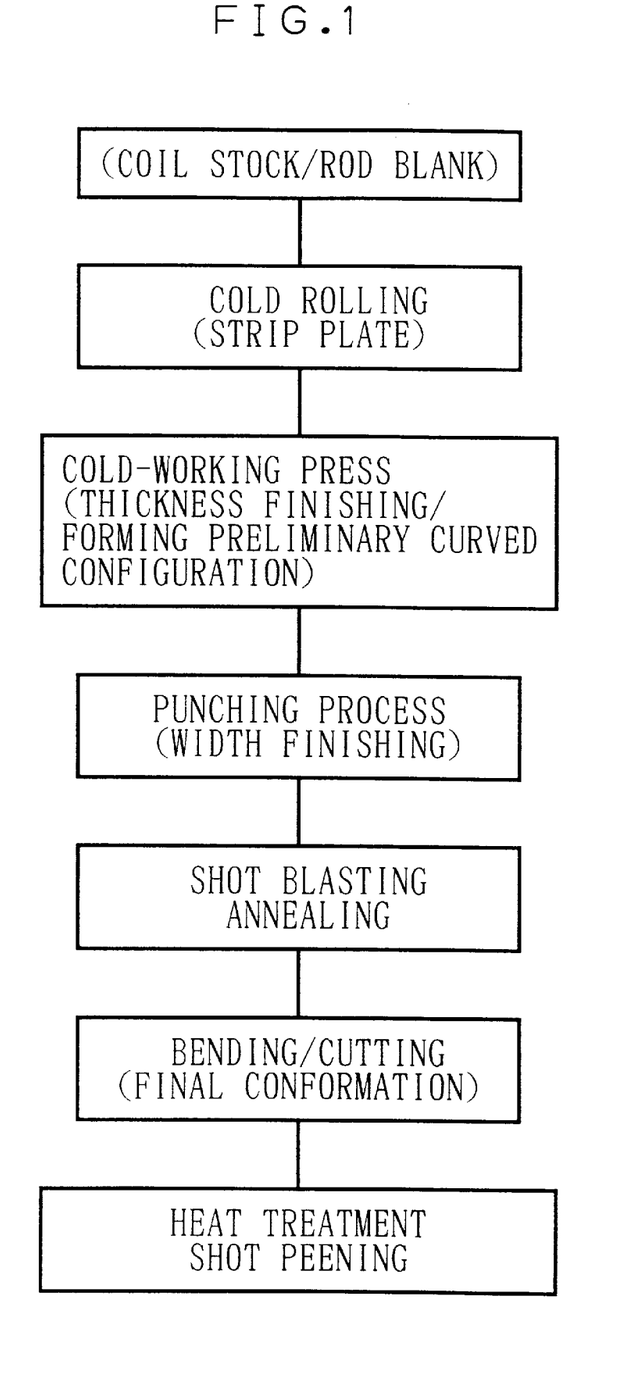
FIG. 1 is a flow chart outlining steps in the manufacture of an undulated plate spring in accordance with the present inventive method.
Figure 2:
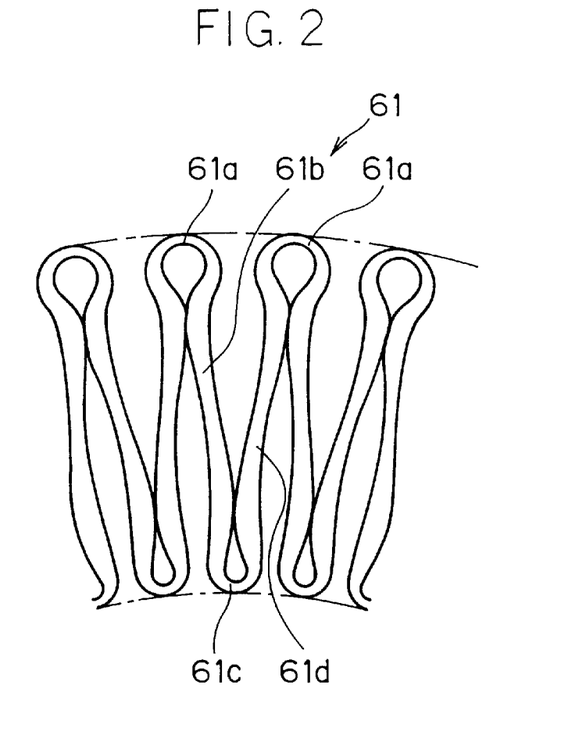
FIG. 2 is a plan view of the finished configuration of an undulated plate spring manufactured in accordance with one aspect of the present inventive method.
Figure 3:
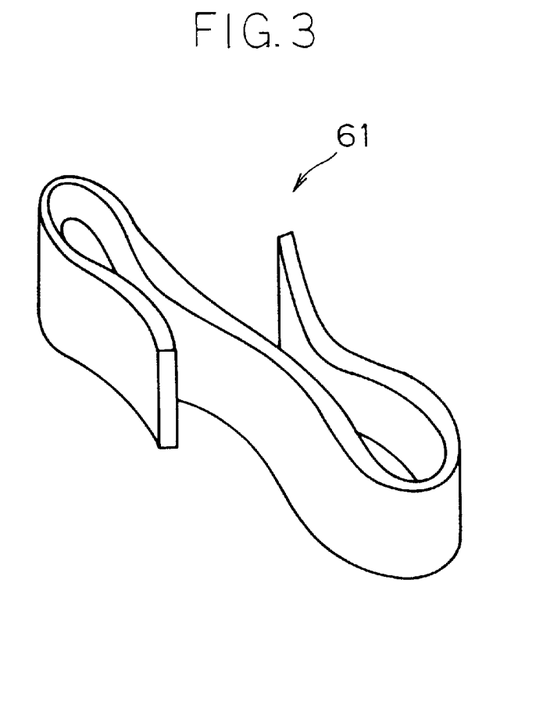
FIG. 3 is a fragmentary orthographic view of reciprocal undulations of the undulated plate spring of FIG. 2.

The flow chart of FIG. 1 outlines steps in the manufacture of an undulated plate spring 61, illustrated in FIGS. 2 and 3, as an example manufactured in accordance with the cold-working method of the present invention. The finished configuration of the undulated plate spring formed by bending a strip blank is of reciprocal repeating undulated portions that are contiguous ("undulations" hereinafter). Each undulation is of predetermined form corresponding to one bending cycle, and further is of varying thickness. The undulations thus of the presently described undulated plate spring 61 can be, for example, 21 in number.

Figure 4:
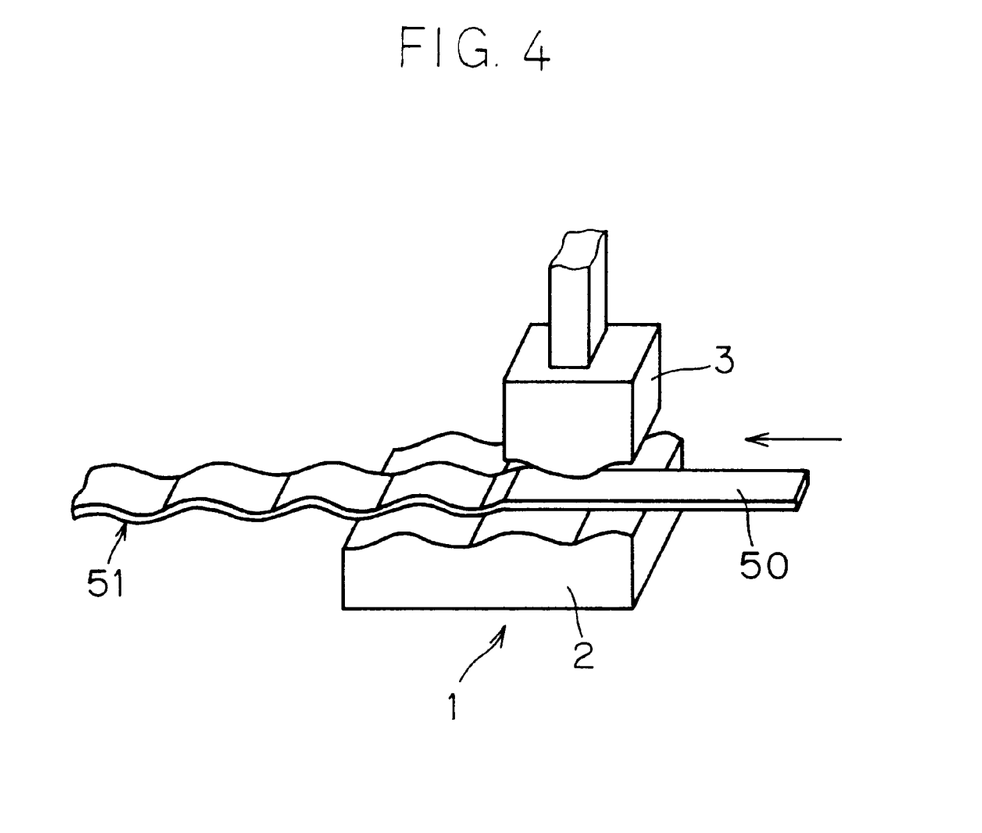
FIG. 4 is a fragmentary orthographic view schematically illustrating press dies cold-working a strip blank according to the present inventive method.

In the process of manufacturing the undulated plate spring, coil stock or a rod blank is cold-worked by rolling into a long and narrow strip 50 of constant thickness, as shown being fed into the dies of a press 1 in FIG. 4. Alternatively, a plate blank may be cut into strips 50 instead of being rolled. Further, it is possible to cold-work the coil stock directly in the following press process without performing the cold-rolling operation.

The subsequent cold-working process is carried out by the press 1. The cold-working process both establishes the thickness of the blank at a predetermined value, and forms a preliminary configuration of repeated curvatures within the limits permitted by cold-working press process. The curvatures of this preliminary configuration are thus greater than the corresponding finished curvatures of the conformation defining the undulated spring, and function to reduce the machine load in the finish-bending process.

Figure 3A:
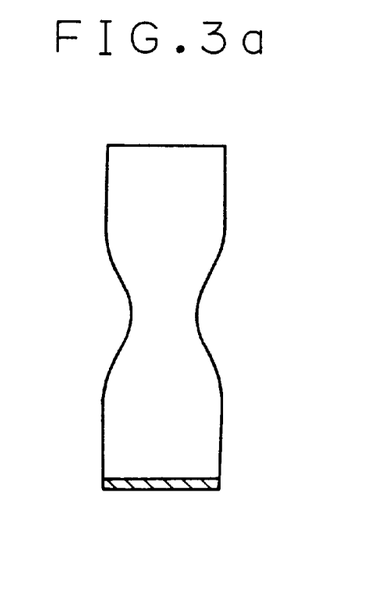
FIG. 3a is cross-sectional view of an undulated plate spring manufactured in accordance with another aspect of the present inventive method.
Figure 3B:
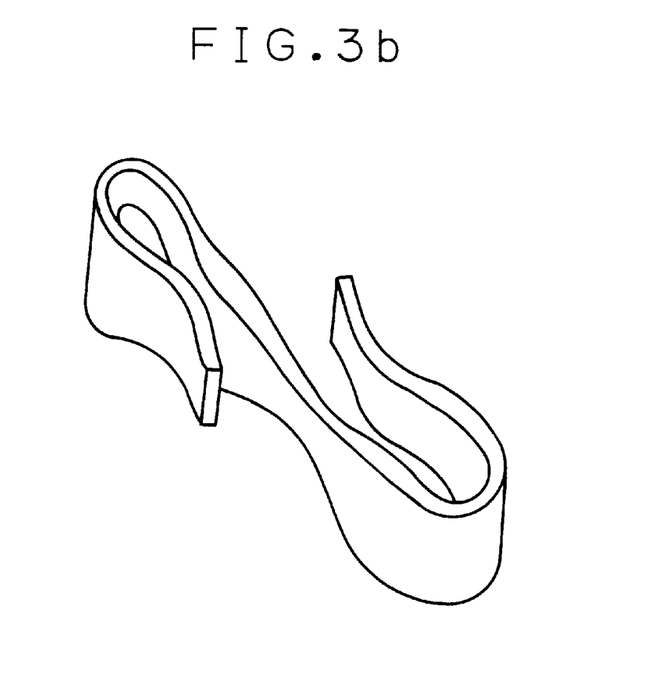

The undulated spring may be alternatively manufactured to have varying width, as illustrated in FIGS. 3a and 3b, distinct from varying thickness (described below). The strip blank 50 in this case is subject to a width-dimensioning process carried out before it is worked in the press 1. Further properties are accordingly imparted to the finished undulated spring.

Reference is again made to FIG. 4, schematically illustrating a cold-working press in operation. The press 1 has lower and upper dies 2 and 3. The strip blank 50 is conveyed leftward in FIG. 4 into the press l, thereby positioning the forward end of the strip 50 under the upper die 3. The forward end of the strip 50 is squeezed and formed between the dies 2 and 3. Then, the strip 50 is moved leftward in FIG. 4 by a distance corresponding to the length of the formed portion, and the portion succeeding in the feed direction of the strip 50 is squeezed. The strip 50 is thus successively cold-worked in the press 1. As is accordingly illustrated with reference to FIG. 4, the strip blank 50 is conveyed in the direction corresponding to the lengthwise direction of the formed article, in contrast to the direction blanks are conveyed in the conventional mill-rolling process, as can be seen by comparison with FIG. 8.

Figure 5:
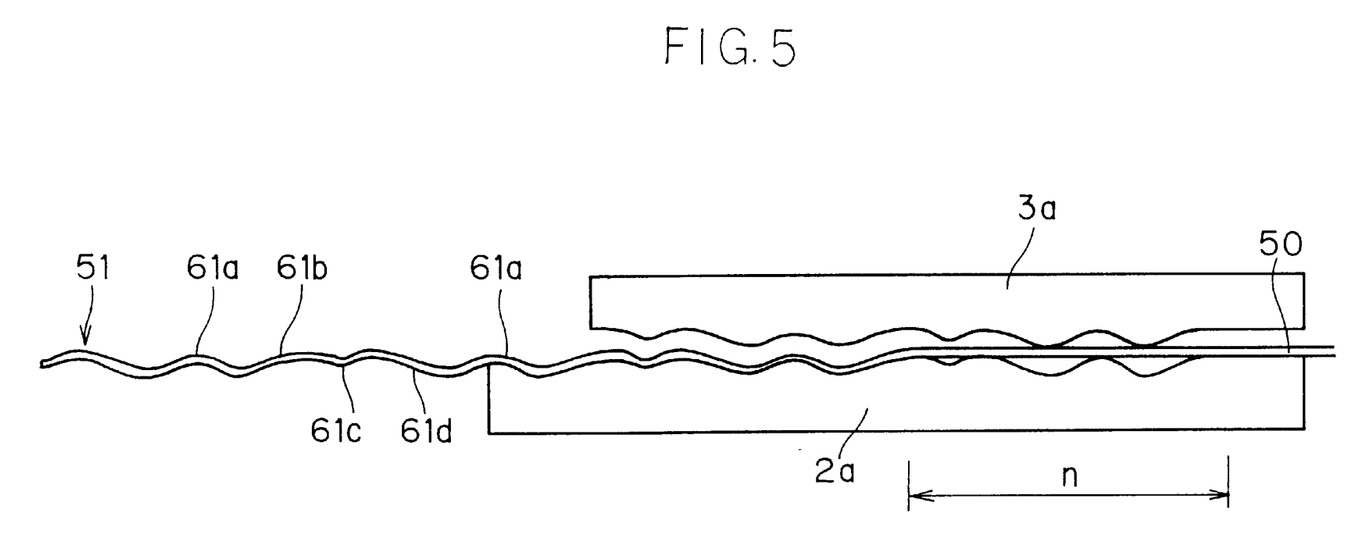
FIG. 5 is a schematic, elevational view illustrating opposing die surfaces defining a forming position and a locating position of a press for cold-working blanks in accordance with the inventive method.

FIG. 4 merely represents the general form of the dies 2 and 3. A more detailed example of die forms is shown in FIG. 5 schematically illustrating practical dies 2a and 3a. The dies 2a and 3a are examples employed for manufacturing the undulated plate spring 61 shown in FIGS. 2 and 3. In FIG. 5, the formed portion 51 of the strip 50 worked by the dies 2a and 3a accordingly is contoured to correspond to those finish-bent portions of the undulated plate spring 61 shown in FIG. 2 and indicated by the corresponding reference marks 61a–61d. Cold-working the formed portion 51 into the preliminary configuration allows it readily to be bent into the final conformation of the undulated plate spring 61.

In FIG. 5, the distance n represents the length of that portion of the strip 30 corresponding to one undulation of the undulated plate spring 61, and is equal to a feed pitch of the strip 50 in the above-described iterative cold-working press process. The distance a also describes the forming position of the press, corresponding to the predetermined form into which the strip 50 is worked, to become one undulation of the undulated plate spring 61. Thus, successive portions of the strip 5O each of pitch n are cold-worked in the press.

Portions of the dies 2a and 3a forward of (in the lefthand direction in FIG. 5) the forming position in the foregoing practical press are established primarily for lengthwise locating of the strip 50 being worked. In FIG. 5, the advance formed portion 51 is shifted into the locating position and is at least partially clasped by the forward portions of the dies 2a and 3a, the opposing surfaces of which are complementary in form to the advance formed portion 51. This locating action accordingly maintains a high degree of accuracy in the lengthwise positioning of the succeeding-formed portion of the strip 50 being worked.

The formed portion 51 of the strip 50 thus cold-worked in the press into its preliminarily configuration can be cut into a design width by punching. Since the width can be variously established this way, various characteristics such as the spring constant of the undulated plate spring accordingly can be determined.

The punched formed portion 31 is further subjected to shot blasting and annealing, and it is then bent and cut to produced an undulated plate spring in its final conformation.

Subsequently, various finishing processes such as heat treatment and shot peening are carried out on the worked undulated plate spring to produce a final product.

Although the above-described embodiment of the inventive method employs the press 1 for the cold-working operations, a rolling mill provided with variable-gapped rolls or irregular rolls may be used initially for imparting a desired thickness to the blank to be worked in the press.

Figure 6:
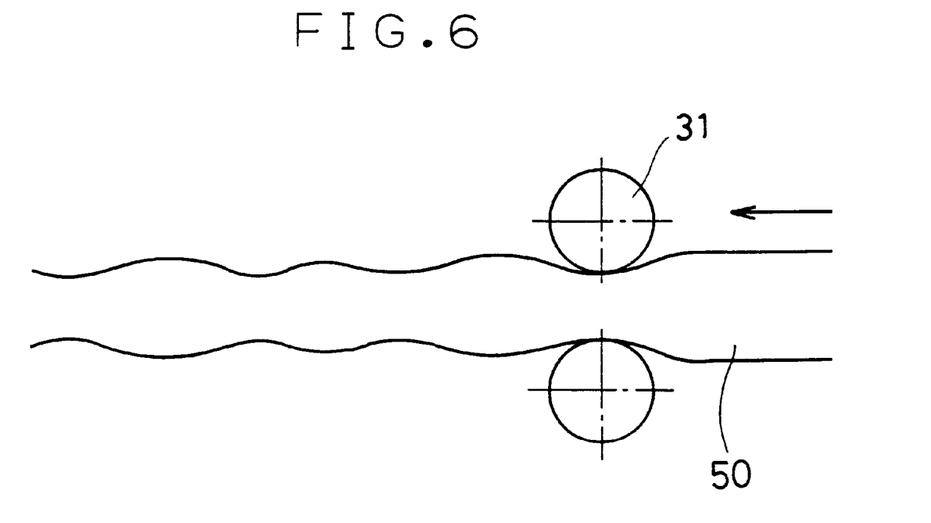
FIG. 6 is a schematic, cross-sectional view showing a strip blank worked between variable-gapped rolls to vary thickness in accordance with another aspect of the present inventive method.

FIG. 6 illustrates a cold-working operation by a rolling mill provided with variable-gapped rolls 31. In this process, the gap separating the rolls 31 is variably adjusted in accordance with the feeding of the strip 50 such that the strip 50 thus squeezed between the rolls 31 can be finished into a predetermined varying thickness.

Figure 7:
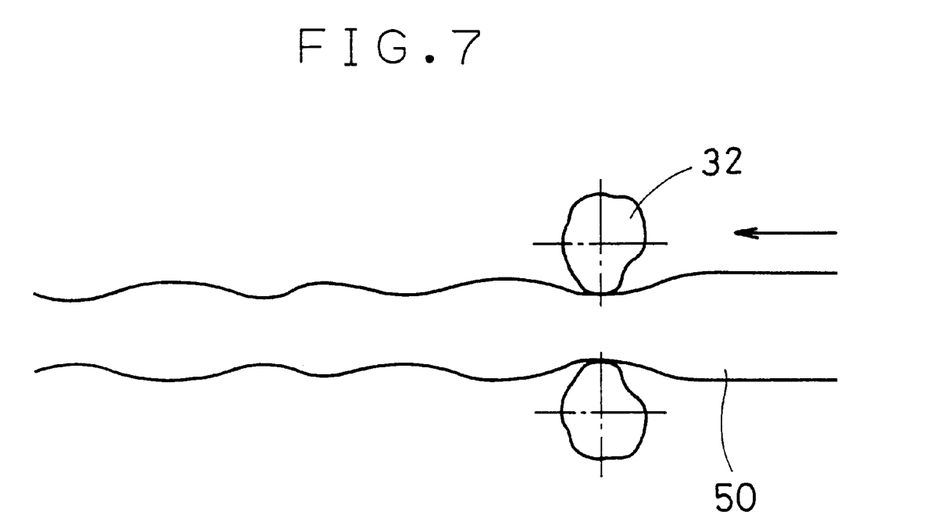
FIG. 7 is a schematic, cross-sectional view corresponding to FIG. 6, showing a strip blank worked between irregular rolls to vary thickness in accordance with a further aspect of the present inventive method.

FIG. 7 illustrates a cold-working operation by a rolling mill provided with irregular rollers 32. The squeezing pressure between the irregular rollers 32 is correspondingly varied, such that the strip 50 can be finished into a desired varying thickness.

Various details of the present invention may be changed without departing from its spirit nor its scope. Furthermore, the foregoing description of the embodiments according to the present invention are provided for illustration only, and not for the purpose of limiting the invention as defined by the appended claims and their equivalents.

What is claimed is:

1. A metalworking method of cold-working strip blanks to form an undulated spring, comprising:

a first step of shaping a strip blank to impart varying thickness to the strip, a second step of squeezing a first portion of the strip into a predetermined form in a forming position of a press, the press having an upper die and a lower die each being formed with a complementary predetermined form which define a predetermined repeating pattern to be formed on the strip blank, the lower surface being formed with the predetermined form in a forming position and repeated again in a locating position;

a third step of shifting the strip in a feed direction relative to the press by a distance corresponding to a dimension of the predetermined form, thereby advancing the just squeezed portion of the strip to the locating position of the lower die ahead in the feed direction and advancing an unsqueezed portion of the strip blank to the forming position of the press;

a fourth step wherein said first and said second steps are repeated a predetermined number of times, such that the strip is formed into a predetermined preliminary configuration including repeated preliminary curvatures greater than corresponding finished curvatures defining the undwated spring; and a fifth step of finish-bending the strip along the preliminary curvatures into a configuration of reciprocal repeating undulations.

2. The metalworking method according to claim 1, wherein the feed direction is parallel to a longitudinal dimension of the strip;

in said third step the distance by which the strip is shifted corresponds to a lengthwise dimension of said predetermined form, and the first portion of the strip is located into the locating position longitudinally ahead of the second portion of the strip; and in said fourth step, the predetermined preliminary configuration of the strip includes the predetermined form repeated at least twice contiguously along the longitudinal dimension of the strip.

3. The metalworking method according to claim 1, wherein the forming position of the press includes opposing die surfaces complementary to said predetermined form, and one of the opposing surfaces is repeated at least partially in the feed direction of the blank to define the locating position, such that in said second step the first portion of the blank is captured rearwardly in the feed direction into the locating position of the press at least partially.

4. The metalworking method according to claim 2, wherein the forming position of the press includes opposing die surfaces complementary to said predetermined form, and one of the opposing surfaces is repeated at least partially in the feed direction of the blank to define the locating position, such that in said second step the first portion of the blank is captured rearwardly in the feed direction into the locating position of the press at least partially.

5. The metalworking method according to claim 1, wherein said first step is a squeezing operation carried out by the press simultaneously with said second, third and fourth steps.

6. The metalworking method according to claim 2, wherein said first step is a squeezing operation carried out by the press simultaneously with said second, third and fourth steps.

7. The metalworking method according to claim 1, wherein the undulated spring is of varying width in addition to varying thickness, the metalworking method further comprising a width-dimensioning process carried out on the strip as formed in said second step before said fifth step.

8. The metalworking method according to claim 2, wherein the undulated spring is of varying width in addition to varying thickness, the metalworking method further comprising a width-dimensioning process carried out on the strip as formed in said second step before said fifth step.

9. The metalworking method according to claim 3, wherein the undulated spring is of varying width in addition to varying thickness, the metalworking method further comprising a width-dimensioning process carried out on the strip as formed in said second step before said fifth step.

10. The metalworking method according to claim 4, wherein the undulated spring is of varying width in addition to varying thickness, the metalworking method further comprising a width-dimensioning process carried out on the strip as formed in said second step before said fifth step.

11. The metalworking method according to claim 1, wherein said first step is carried out by a roll mill.

12. The metalworking method according to claim 2, wherein said first step is carried out by a roll mill.

13. The metalworking method according to claim 3, wherein said first step is carried out by a roll mill.

14. The metalworking method according to claim 4, wherein said first step is carried out by a roll mill.

15. The metalworking method according to claim 1, wherein said first step is carried out by a roll mill having irregular rolls.

16. The metalworking method according to claim 2, wherein said first step is carried out by a roll mill having irregular rolls.

17. The metalworking method according to claim 3, wherein said first step is carried out by a roll mill having irregular rolls.

18. The metalworking method according to claim 4, wherein said first step is carried out by a roll mill having irregular rolls.

19. The metalworking method according to claim 5, wherein said first step is carried out by a roll mill having irregular rolls.

20. A metalworking method of cold-working blanks, comprising:

moving a blank in a feed direction between a lower die of a press and an upper die of the press, the upper and lower dies each being formed with complimentary predetermined curved contours for pre-forming the blank into an undulated form for subsequent formation into an undulated spring, where the lower die is formed with the curved contours in a forming position and also in a locating position such that the curved contours in the forming position and the locating position define a repeating pattern;

deforming a first portion of a blank between the upper die and the forming position of the lower die into a predetermined configuration corresponding to the curved contours of the upper and lower dies;

shifting the blank a predetermined distance in the feed direction, the predetermined distance corresponding to a length in the feed direction of the predetermined configuration, thereby moving the first portion of the blank from the forming position of the lower die to the locating position of the lower die such that the first portion of the blank is retained by its deformed shape on the locating portion of the lower die and a further portion of the blank is located above the forming position of the lower die;

repeating the deforming step to form a new first portion of the blank;

repeating the shifting step to move the new first portion to the locating position of the lower die such that the new first portion of the blank is retained by its deformed shape on the locating portion of the lower die and another further portion of the blank is located above the forming position of the lower die.

21. The metalworking method as set forth in claim 20, further comprising:

shaping the blank such that the blank is formed predetermined varying thickness prior to said moving step and said deforming step.

22. The metalworking method as set forth in claim 21, wherein the feed direction is parallel to a longitudinal dimension of the blank and movement of the blank in the feed direction corresponds to a lengthwise dimension of the predetermined curved contours.

23. The metalworking method as set forth in claim 22, further comprising the step of:

forming the blank with a varying width, the width of the blank being perpendicular to the longitudinal dimension of the blank and perpendicular to the thickness of the blank.

24. The metalworking method as set forth in claim 23, wherein the thickness of the blank is formed by rollers disposed on opposite sides of the blank, a distance between the rollers being controlled in accordance with movement of the blank.

25. The metalworking method as set forth in claim 20, further comprising the step of:

forming the blank with a varying width, the width of the blank being perpendicular to a longitudinal dimension of the blank and perpendicular to a thickness of the blank.

26. The metalworking method as set forth in claim 25, wherein the thickness of the blank is formed by rollers disposed on opposite sides of the blank, a distance between the rollers being controlled in accordance with movement of the blank.

* * * * *